United States Patent [19]

Schuck

[11] 4,148,558

[45] Apr. 10, 1979

[54] OPTICAL TRANSMISSION LINE BY-PASS RELAY

[75] Inventor: David B. Schuck, Escondido, Calif.

[73] Assignee: NCR Corporation, Dayton, Ohio

[21] Appl. No.: 842,869

[22] Filed: Oct. 17, 1977

[51] Int. Cl.² .................................................. G02B 5/14
[52] U.S. Cl. ..................... 350/96.20; 250/227; 350/96.18
[58] Field of Search ............... 350/96.20, 96.10, 96.24, 350/96.18, 266, 269; 250/227

[56] References Cited

U.S. PATENT DOCUMENTS

| 3,519,116 | 7/1970 | Koehn | 350/96.20 |
| 3,976,876 | 8/1976 | Broeker | 250/227 |
| 4,057,719 | 11/1977 | Lewis | 350/96.16 |
| 4,082,435 | 4/1978 | Zeitz | 350/269 |
| 4,088,387 | 5/1978 | Lewis | 350/96.20 |

Primary Examiner—John K. Corbin
Assistant Examiner—Stewart Levy
Attorney, Agent, or Firm—J. T. Cavender; Stephen F. Jewett; Edward Dugas

[57] ABSTRACT

An optical by-pass relay for use with an optical transmission line wherein transmitted optical energy is focused on a light detector for conversion into an electrical signal which electrical signal is coupled to a utilization device. A light emitter coupled to the utilization device, transmits lights onto the transmission line to thereby place the utilization device into the optical transmission line. Means are provided for displacing the detector and emitter from the optical path of the transmission line and for positioning an optical coupler such as a glass rod into the optical path to thereby by-pass the utilization device while providing continuity to the optical signal traversing the optical transmission line.

4 Claims, 4 Drawing Figures

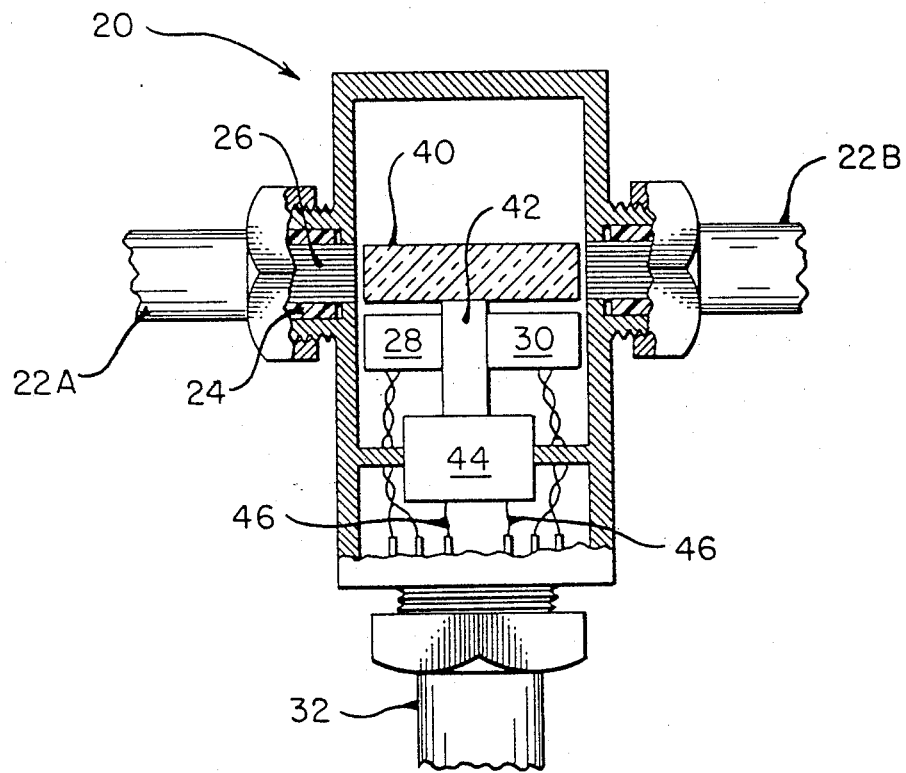
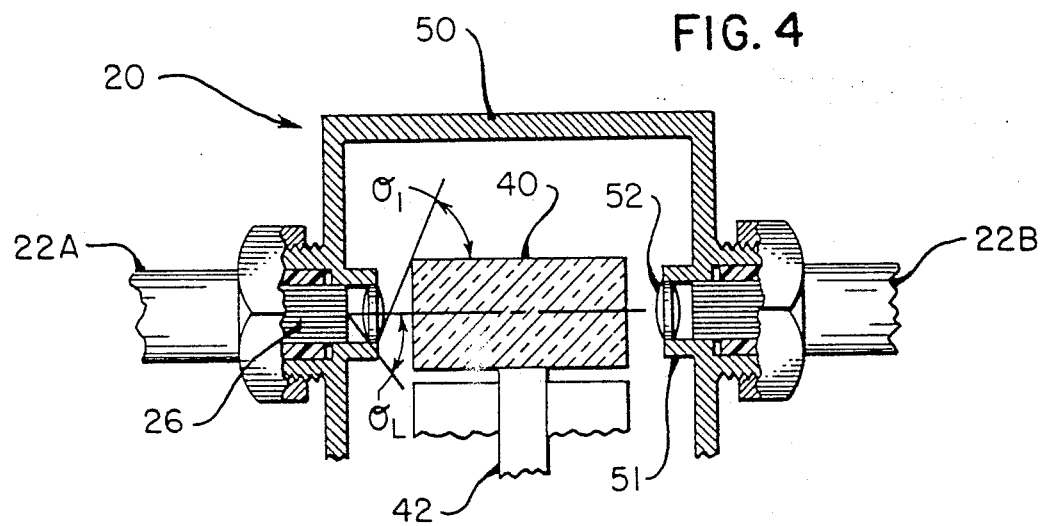

OPTICAL TRANSMISSION LINE BY-PASS RELAY

BACKGROUND OF THE INVENTION

The present invention is directed to optical transmission lines of the type that normally couple one or more utilization devices into a signal loop and more particularly, to a by-pass relay for connecting and disconnecting a utilization device from an optical transmission line while still maintaining the optical continuity of the line.

Optical transmission lines have come into recent use because of their ability to couple signals from one point to another with a minimum amount of interference.

In electrical systems, interference is generally caused by electromagnetic radiaton, cross-coupling of signals and/or noise. These interfering effects, of course, diminish the quality of the received signal. In digital systems, for example, computer systems, the requirement for coupling a central processing unit to one or more peripheral units located in different cabinets some distance from the central processing unit creates a requirement for coupling signals with interference eliminated totally, or minimized to the smallest of levels, otherwise computing errors will result.

In such systems, it is necessary that the peripheral units be capable of being logically connected or disconnected from the transmission line without disrupting the operation of the loop as it affects other peripheral devices.

From the foregoing, it appears natural that a transmission line that would have the best noise immunity would be implemented using fiber optics. Such being the case, the present invention directs itself to the problem that arises as regards the connecting and the disconnecting of the peripheral device into the optical transmission line. Optical transmission lines may consist of a single optical fiber or a bundle of optical fibers. The interconnections between remotely disposed stations is established utilizing schemes that are analogous to electrical systems. These stations may be interconnected by a loop or a line data bus which interconnection reduces the number of optical signal transmission lines that have to be used from, for example, the number that would be required if each individual station and/or peripheral device were connected directly to the central station or computer processing unit CPU by its own transmission path.

SUMMARY OF THE INVENTION

The present invention is directed to an optical by-pass relay which relay is interposed in the optical transmission path of an optical transmission line for inserting into optical circuit with said optical transmission path a utilization device.

In the preferred embodiment of the invention, there is provided a moveable member for positioning an optical detector and an optical emitter into the transmission path and for moving the emitter and detector from the optical path and for inserting instead an optical coupler for providing continuity of the transmission path. In the preferred embodiment of the invention, the moveable member is actuated by a solenoid, which solenoid moves the moveable member between a first and a second position. A utilization device such as a computer peripheral unit is electrically coupled to the detector and the emitter for communicating with the optical transmission line.

From the foregoing, it can be seen that it is a primary object of the present invention to provide an improved means for coupling a utilization device to an optical communicaton transmission line.

It is another object of the present invention to provide a means for minimizing the effects on an optical transmission line when a staton is not to be interconnected into the optical transmission line.

These and other objects of the present invention will become more apparent when taken in conjunction with the following description and drawings throughout which like characters indicate like parts and which drawings form a part of the present application.

BRIEF DESCRIPTION OF THE DRAWINGS

FIG. 3 is a partially sectioned view of the preferred embodiment of FIG. 2 shown in a second operating mode; and FIG. 4 is a partially sectioned view of another preferred embodiment of the invention.

DESCRIPTION OF THE PREFERRED EMBODIMENT

Figure 1:
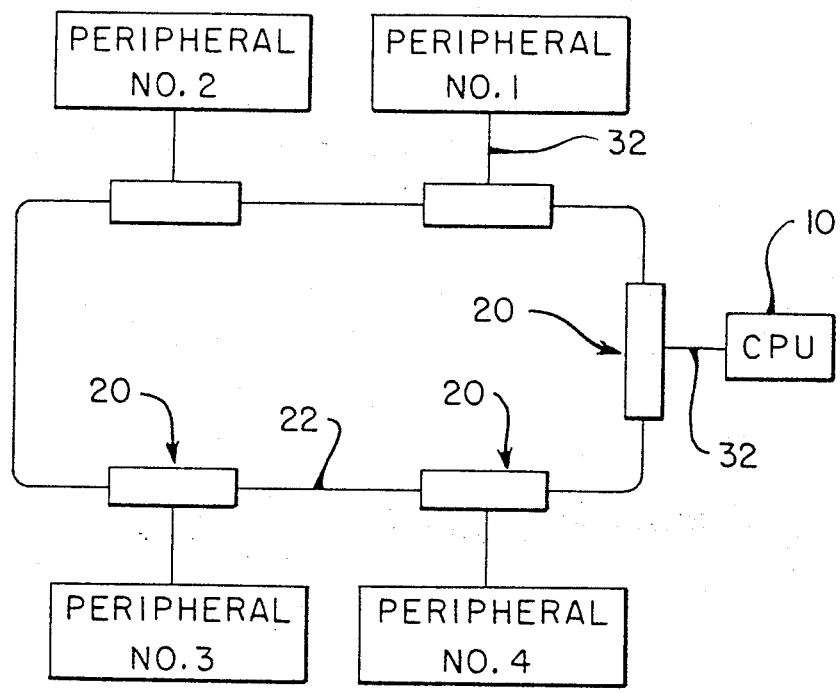
FIG. 1 is a block diagram illustrating the positioning of the present invention in an optical transmission system.

In FIG. 1 a central processing unit (CPU) 10 is electrically coupled by means of a cable 32 to an optical by-pass relay 20. The relay 20 is interposed in an optical transmission loop 22 which also contains a number of other identical by-pass relays, each of which is coupled to an associated peripheral unit. The peripheral units may be a computer terminal or other type of station which for various reasons must either talk to or communicate with other peripheral units and/or the central processing unit.

Figure 2:
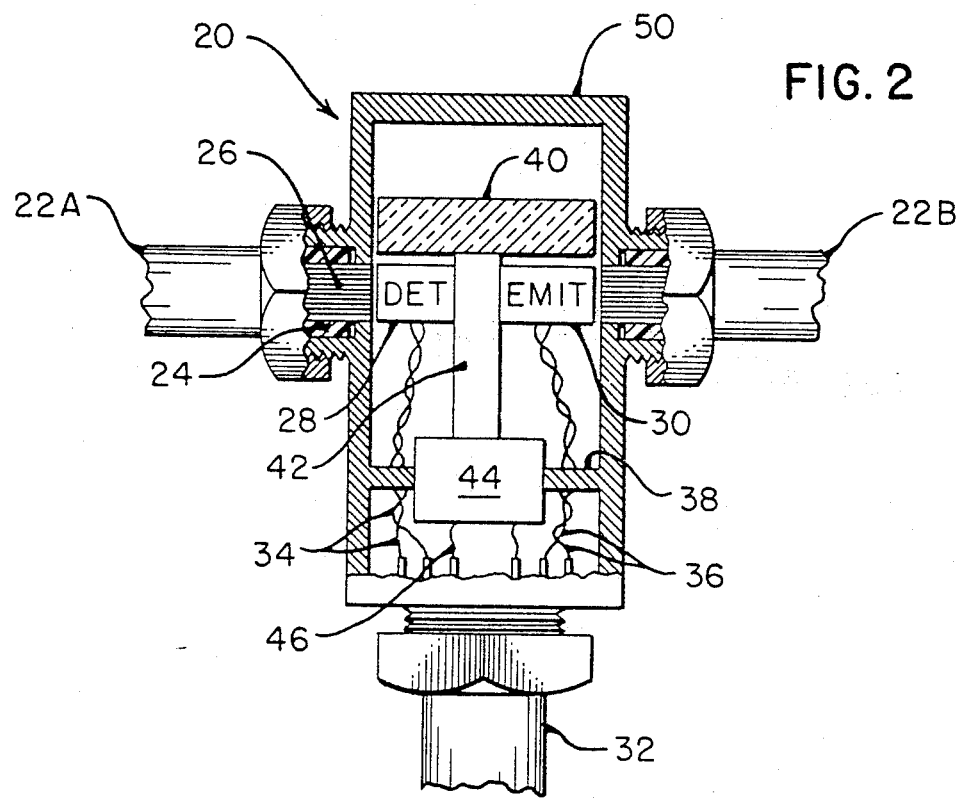
FIG. 2 is a partially sectioned view of a preferred embodiment of the present invention shown in a first operating mode.

Referring to FIG. 2, the by-pass relay 20 is shown having an outer housing 50 to which there is connected a bundle of fiber optics 26 which bundle constitutes an optical wave guide 22A. The optical bundle 26 is encased in an optically opaque covering 24 to afford a degree of protection to the fibers. For the embodiment shown, the optical wave guide 22A is an input wave guide, while the optical wave guide 22B is an output wave guide. Positioned within the housing 50 is a solenoid member 44 which member is rigidly held in position by a support member 38. Extending from the solenoid 44 is a moveable actuating arm 42 onto which is fixed an optical member 40 such as a glass rod having an index of refraction which corresponds to the index of refraction of the optical fibers 26. The glass rod 40 may be coated with an opaque substance and may utilize a graded index of refraction. In addition, an optical detector 28 is fixed to the moveable member 42 such that in position No. 1, which is shown in FIG. 2, the light emitted by the optical wave guide 22A will be detected by the detector 28 and converted into a corresponding electrical signal. A light emitter 30 for converting electrical signals to optical signals is also affixed to the moveable member 42 and in position No. 1 directs its light to the optical waveguide 22B. Electrical conductors 34, from the detector 28, are routed to an electrical cable 32 along with conductors 36 from the emitting element 30. The actuating conductors 46 which are connected to the solenoid element 44 are also routed to the cable 32. The conductors directed to cable 32 are connected by cable 32 to their respective utilization device, which may, for example, be a CPU, a peripheral device or other desired unit.

In operating position No. 1 the the utilization device may sample the electrical signal from the detector 28 and perform some operation in response to that signal, and in turn, emit through emitter 30 a signal which is different than the signal received by the detector 28. Such being the case, the peripheral unit and/or CPU connected to the output optical wave guide 22B will receive a signal which differs from the signal which appeared at the input optical wave guide 22A. In another mode of operation, the signal present at the detector 28 can be coupled not only to the utilization device 32 but also to the emitter 30. In such a situation, the detector and emitter essentially allow the transmission of the signal present at the input optical wave guide to be transmitted to the output optical wave guide, while simultaneously permitting utilization of the signal by the utilization device.

Referring now to FIG. 3 wherein a second operating position, namely position No. 2, is shown for the optical relay. In position 2, the solenoid 44 is actuated by its associated utilization device through leads 46. In position 2, the moveable member is pulled inwards so as to position the optical member 40 directly into the optical path between the input and output optical wave guides 22A and 22B, respectively. Such being the case, the detector and emitter are removed from the circuit which in turn removes the utilization device from the circuit. With the optical member 40 in place, signals are coupled through the optical member to the next utilization device on the transmission line that is connected to the output wave guide.

In FIG. 4 a second embodiment of the by-pass relay 20 is shown utilizing lenses 52 mounted by a holder 51 to the housing 50 in optical alignment with the optical wave guides 22A and 22B.

The following formulas are useful in designing the system utilizing fiber optical bundles and lenses in accordance with the embodiment of FIG. 4:

$$P_{glass\ rod} = 2\pi B\ P_f A_{source} \left(\frac{1 - \cos \sigma_L}{1 - \cos \sigma_1}\right)(1 - \cos \sigma N_A) \left(\frac{M_A}{M}\right)^2$$

wherein:

$$M_A = \frac{\text{diameter of glass rod}}{\text{diameter of bundle fiber}}$$

$$M = \frac{\text{distance of glass rod from lens}}{\text{distance of bundle fiber interface from lens}}$$

$$\sigma_1 = \tan^{-1} \frac{\text{diameter of lens + diameter of fiber}}{2(M + 1) \times f}$$

$$\sigma_L = \tan^{-1} \left\{ M\left(\frac{\text{diameter of lens + diameter of fiber}}{2(M + 1)f}\right)\right\}$$

where
f = focal length of lens
$p_f$ = packing factor (number less than 1 which represents the losses that are incurred due to the open spaces between each of the optical fibers that form the bundle)
B = Brilliance of light source
A = cross sectional area of fiber optical bundle
P glass rod = power (light) within the glass rod.

In each of the preferred embodiments of the invention the diameter of the glass rod 40 is approximately twice that of the optical bundler.

Light detectors which can be utilized for detector 28 are sold by:

|  | Part No. |
| --- | --- |
| Spectronics | SPX 2232 |
| Hewlett-Packard | 5082 4205 |

Light emitters which can be utilized for emitter 30 are sold by:

|  | Part No. |
| --- | --- |
| RCA | CA 30123 |
| Spectronics | SPX 3191-2 |
| Texas Instruments | XL 35 |

Fiber optics which can be utilized for optical wave guides 22A and 22B are sold by:

|  | Part No. |
| --- | --- |
| ITT | GG-02-8 (Graded Index) |
| DuPont | PFX-120 R (Step Index) |

While there has been shown what is considered to be the preferred embodiments of the invention, it will be manifest that many changes and modifications can be made therein without departing from the spirit and scope of the invention. It is intended, therefore, in the annexed claims, to cover all such changes and modifications as may fall within the true scope of the invention.

What is claimed is:

1. An optical by-pass relay comprising:
an optical input path;
an optical output path;
a solenoid having an actuating input for positioning the movable member of said solenoid in a first or a second position;
a detector operatively connected with said movable member and positioned in said optical path for a first position of said movable member;
means for operatively coupling said detector to a utilization device;
an optical emitter operatively connected with said movable member and also positioned in said optical output path for said first position of said movable member, said emitter operatively coupled to said utilization device; and
optical coupler means affixed to said movable member such that in a second position of said movable member said optical coupler completes the optical path from said input path to said output path and said utilization device is by-passed.

2. An optical by-pass relay comprising:
an optical input path;
an optical output path;
a moveable member;
a detector operatively connected with said moveable member and positioned in said output path for a first position of said moveable member;
means for operatively coupling said detector to a utilization device;
an optical emitter operatively connected with said moveable member and also positioned in said optical output path for said first position of said moveable member, said emitter operatively coupled to said utilization device;

optical coupler means affixed to said moveable member such that in a second position of said moveable member said optical coupler completes the optical path from said input path to said output path and said utilization device is by-passed; and lens means interposed in said optical input path and said optical output path for optical focusing to and from said optical coupler means.

3. An optical by-pass relay comprised of a rigid housing member;

a first fiber optical bundle coupled to said rigid housing member;

a second fiber optical bundle coupled in optical alignment to said first fiber optical bundle and to said rigid housing member;

solenoid means affixed within said housing member and having a moving member responsive to an actuating signal;

an optical detector coupled to the moving member of said solenoid means;

an optical emitter coupled to the moveable member of said solenoid means, said moveable member positioned such that said detector and said emitter are in optical alignment with said fiber optical bundles affixed to the housing member;

an optical coupler affixed to the moveable member of said solenoid means and adapted to optically couple said fiber optical bundles when the moveable member of said solenoid means is in a second actuating position; and utilization means coupled to receive the detected signal from said detector means and adopted to provide a signal to said emitter means so as to pass and generate signals for transmission along said fiber optical bundles.

4. The optical by-pass relay according to claim 3 and further comprising; lens means interposed between said optical coupler and said first and said second fiber optical bundles for facilitating optical energy transfer.

* * * * *